US012746171B2

(12) United States Patent
Buetzer et al.

(10) Patent No.: US 12,746,171 B2
(45) Date of Patent: Sep. 29, 2026

(54) MOVING DEVICE FOR MOVING A HUMAN THUMB, HAND-EXOSKELETON AND METHOD OF GRASPING

(71) Applicant: ETH Zurich, Zurich (CH)

(72) Inventors: Tobias Lukas Buetzer, Zug (CH); Antoine Nicolas Aupee, Lausanne (CH); Roger Gassert, Zurich (CH); Olivier Lambercy, Zurich (CH); Urs Alexander Tassilo Hofmann, Zurich (CH)

(73) Assignee: ETH Zurich, Zurich (CH)

( * ) Notice: Subject to any disclaimer, the term of this patent is extended or adjusted under 35 U.S.C. 154(b) by 854 days.

(21) Appl. No.: 17/987,438

(22) Filed: Nov. 15, 2022

(65) Prior Publication Data

US 2023/0157922 A1 May 25, 2023

Related U.S. Application Data

(63) Continuation of application No. PCT/EP2021/062551, filed on May 11, 2021.

(30) Foreign Application Priority Data

May 15, 2020 (EP) .................................... 20174943

(51) Int. Cl.
*A61H 1/02* (2006.01)
*B25J 9/00* (2006.01)

(52) U.S. Cl.
CPC .......... *A61H 1/0288* (2013.01); *B25J 9/0006* (2013.01); *A61H 2201/149* (2013.01); (Continued)

(58) Field of Classification Search
CPC ................ A61H 1/0288; A61H 1/0285; A61H 2001/027; B25J 9/0006
See application file for complete search history.

(56) References Cited

U.S. PATENT DOCUMENTS 10,028,880 B2 7/2018 Arata et al.
11,786,434 B2 * 10/2023 Bonutti ................ A61H 1/0277 601/5

(Continued)

FOREIGN PATENT DOCUMENTS

CN 106943277 A 7/2017
CN 209478212 U * 10/2019

(Continued)

OTHER PUBLICATIONS

EspaceNet Translation Qi CN 209478212 (Year: 2019).*

(Continued)

*Primary Examiner* — Victoria Murphy
*Assistant Examiner* — Sydney Reyes Russell
(74) *Attorney, Agent, or Firm* — Muncy, Geissler, Olds & Lowe, P.C.

(57) ABSTRACT

A moving device for moving a human thumb, in particular for moving the thumb between a resting position and a grasping position. A thumb bending section is adapted to at least partially move the thumb between a flexed position and an extended position. The thumb bending section has a gear unit for transforming a rotation of a rotation element, which is rotatably mounted to a housing, into an essentially linear movement between a translation element and the housing. The thumb bending section further has a first flexion spring mechanically connected to the translation element and adapted to be fixed with a first proximal end of the first flexion spring relative to a human thumb at a position in a proximal distance to the metacarpophalangeal joint or at a position between the metacarpophalangeal joint and the carpometacarpal joint.

14 Claims, 8 Drawing Sheets

(52) U.S. Cl.
CPC ................ *A61H 2201/1635* (2013.01); *A61H 2201/165* (2013.01); *A61H 2201/1676* (2013.01)

(56) References Cited

U.S. PATENT DOCUMENTS

| | | | | |
|---|---|---|---|---|
| 2016/0015590 | A1* | 1/2016 | Arata | B25J 9/0006 623/64 |
| 2020/0329794 | A1* | 10/2020 | Luplow | A41D 19/0024 |
| 2020/0345575 | A1 | 11/2020 | Randazzo et al. | |

FOREIGN PATENT DOCUMENTS

| | | | | |
|---|---|---|---|---|
| CN | 110664588 | A * | 1/2020 | A61H 1/0288 |
| WO | WO2019092559 | A1 | 5/2019 | |

OTHER PUBLICATIONS

EspaceNet Translation Zhang CN 110664588 (Year: 2020).*
International Search Report dated Aug. 16, 2021 in corresponding application PCT/EP2021/062551.

* cited by examiner

MOVING DEVICE FOR MOVING A HUMAN THUMB, HAND-EXOSKELETON AND METHOD OF GRASPING

This nonprovisional application is a continuation of International Application No. PCT/EP2021/062551, which was filed on May 11, 2021, and which claims priority to Europe patent application No. 20174943.9, which was filed in Europe on May 15, 2020, and which are both herein incorporated by reference.

BACKGROUND OF THE INVENTION

Field of the Invention

The present invention relates to a moving device for moving a human thumb, a hand-exoskeleton for moving at least one finger of a human hand comprising a moving device according to the invention and a method of grasping an object.

Description of the Background Art

Grasping is one of the most important functions of a human hand for interacting with the world. The most important part of the hand to realize grasping is the thumb, which is the digit with the most complex ability to move. For grasping in typical daily activities, it is essential that the thumb is rotatable and flexible such that it can be moved into opposition to preferably at least one other finger Due to a natural limitation of mobility or as a result of an accident or due to work-related fatigue or damage to the functionality of the hand, it may be necessary to support the grasping process with an appropriate device.

It is desirable that such a device allows thumb flexion as well as thumb opposition and that it is comfortable for a person to wear, lightweight, easy to use and inexpensive to produce.

There are several mechanisms and devices known from research that are adapted to support the flexion movement of a human finger and therefore also for a thumb.

For example, U.S. Pat. No. 10,028,880 B2 shows a hand exoskeleton with a three-layered sliding spring mechanism with a single driving mechanism to transmit power to the joints of a human finger to support the flexion motion of the finger. The hand exoskeleton shown here is able to at least support the bending of the three joints of the finger.

Mechanisms to move a thumb in an opposition position are only partially integrated in finger moving devices. Typically, the thumb is fixed to a certain position, wherein a thumb fixation leads to a decrease of the grasping movements that are realizable.

Some solutions known from the literature are designed to imitate the complex movements of individual fingers with a large number of joints and levers. However, such solutions are typically not optimal in terms of wearing comfort because of their heavy weight and large construction volume.

SUMMARY OF THE INVENTION

It is therefore an object of the present invention to provide a moving device, a hand-exoskeleton and a method of grasping that support the natural grasping of a human hand in an easy way.

In the following the carpometacarpal joint is abbreviated by the expression CPC joint, the metacarpophalangeal joint is abbreviated by the expression MCP joint and the interphalangeal joint is abbreviated by the expression IP joint.

In the following the expression distal can mean directed away from the center of the body of a person and the expression proximal can mean directed to the center of the body of a person. The expression dorsal refers to the back of a human body part, in the context of the invention typically the back of the human hand.

The resting position of the thumb is the anatomical position in which the thumb is in an essentially unflexed position, adducted to the index finger.

The grasping position of the thumb is the anatomical position in which the thumb is in opposition to at least one other finger of the hand, such that an object can be fixed between the thumb and the part of the hand it is in an opposition to it.

The opposition position of the thumb is the anatomical position in which the thumb is in an opposition to at least one other finger of the hand. There are three types of opposition known:

Pad opposition usually occurs between palmar surfaces of the fingers and the thumb, near to or on the pads. The thumb is for example in a pad opposition when holding a small object between the palmar side of index finger and the thumb.

Side opposition can mean a position like for example when holding or using a typical door key.

The flexed position of the thumb is the anatomical position in which the angle between at least two bones or parts of the thumb is reduced. In other words, a thumb in a flexed position is bent.

The extended position of the thumb is the anatomical position in which, unlike in the flexed position, all bones or parts of the thumb are arranged in one straight line. In other words, a thumb in the extended position is stretched.

A first aspect of the invention is a moving device for moving a human thumb, in particular for moving the thumb between a resting position and a grasping position, comprising a thumb bending section adapted to at least partially move the thumb between a flexed position and an extended position. The thumb bending section comprises a gear unit for transforming a rotation of a rotation element, which is rotatably mounted to a housing, into an essentially linear movement between a translation element and the housing.

The thumb bending section further comprises a first flexion spring mechanically connected to the translation element and adapted to be fixed with a first proximal end of the first flexion spring relative to a human thumb at a position in a proximal distance to the metacarpophalangeal joint, in particular at a position between the metacarpophalangeal joint and the carpometacarpal joint.

The thumb bending section further comprises a second flexion spring mechanically connected to the housing and adapted to be fixed with a second distal end of the second flexion spring to the human thumb at a position in a distal distance to the metacarpophalangeal joint, in particular at the distal phalanx and/or the proximal phalanx of the thumb.

By operating the gear unit, a relative translational movement between the translation element and the housing is realized that causes a bending of at least one of the flexion springs and as a result at least a partially bending of the thumb.

The gear unit comprises a rotation element, a translation element and a housing. The rotation element is fixed in or to the housing such that the rotation element is rotatably movable relative to the housing but essentially at least the translational degree of freedom in the direction of the linear movement, in particular the entirety of all translational degrees of freedom, between the rotation element relative and the housing is fixed.

The rotation axis of the rotation element is in a fixed position with respect to the housing such that the translation element is movable relative to the housing in a linear movement.

The rotation axis of the rotation element may be arranged perpendicularly to the direction of the linear movement and a plane extending essentially in parallel to the surface of the thumb to which the moving device is fixed.

The thumb bending section comprises a first flexion spring with a first distal end and a first proximal end. The first flexion spring is mechanically connected to the translation element, typically by its first distal end. The first proximal end of the first flexion spring is adapted to be fixed relative to the thumb. This does not necessarily mean that the first flexion spring it directly fixed to the surface of the thumb. It is included by the invention that only the position of the first proximal end of the first flexion spring is fixed relative to the surface of the thumb, wherein the position of the first proximal end is in a proximal distance to the MCP joint of the thumb to which the moving device is fixed. In particular, the position of the first proximal end is a position between the MCP joint and the CPC joint. In a special embodiment the position of the first proximal end of the first flexion spring is close to the CPC joint, in particular the position is essentially above the CPC joint. Therefore, the thumb bending device may comprise an adjuster to adjust the length of the first flexion spring between its first distal end and its first proximal end such that the first proximal end is fixable to the desired position. The fixation of the first proximal end of the first flexion spring relative to the thumb is adapted to be essentially unchangeable by using the moving device for moving a thumb in the way intended by the invention.

The first flexion spring comprises at least one spring, in particular at least one leaf spring, extending between its first distal end and its first proximal end and which is deformable, in particular bendable. The first flexion spring is adapted to at least partially buckle by moving its first distal end closer to its first proximal end, wherein the buckling in particular occurs away from the surface of the thumb to which the moving device is fixed. Due to the buckling, as a reaction force is directed from the first flexion spring to the thumb, bending of the thumb results.

In an example of the thumb bending section the mechanical connection between the first flexion spring and the translation element is typically fixed with respect to all translational degrees of freedom and all rotational degrees of freedom. It is not excluded by the invention, that the first flexion spring is pivotably fixed to the translational element such that only the rotational degree of freedom around a rotation axis perpendicular to the direction of the linear movement and perpendicular to a plane in which the axis of the linear movement runs and which is essentially parallel to the surface of the thumb to be moved is free.

The thumb bending section comprises a second flexion spring with a second distal end and a second proximal end. The second flexion spring is mechanically connected to the housing, typically by its second proximal end. The second flexion spring is adapted to be fixed with its second distal end to the human thumb. The position of the fixation of the second distal end is in a distal distance to the MCP joint. In particular, the position of the fixation of the second distal end is at the distal phalanx and/or the proximal phalanx of the thumb. At least the second distal end of the second flexion spring is fixed to at least one of the thumb's phalanxes, wherein at least a fixation to the distal phalanx is preferred.

The second flexion spring comprises at least one spring, in particular at least one leaf spring, extending between its second distal end and its second proximal end and which is deformable, in particular bendable. The second flexion spring is adapted to at least partially buckle by moving its second distal end closer to its second proximal end, wherein the buckling in particular occurs away from the surface of the thumb to which the moving device is fixed.

In one special embodiment the thumb bending section of the moving device extends, when fixed to a human thumb, between the second distal end of the second flexion spring fixed to a position at the proximal phalanx of the thumb and the first proximal end of the first flexion spring fixed to a position at the CPC joint.

The gear unit is arranged between the first flexion spring and the second flexion spring, in particular the gear unit is arranged between the MCP joint and the CMC joint of the human thumb.

The gear unit is adapted to transform a rotation movement of a rotation element into an essentially linear movement between a translation element and the housing. This means in other words, that the translation element and/or the housing are movable translationally relative to each other.

In particular two linear movements are possible. By a first linear movement the translational element is movable relative to the housing, wherein the housing is in a relatively fixed position with respect to the thumb to which the moving device is fixed. In other words, essentially only the translational element is moved. By the second linear movement the housing is movable relative to the translational element, wherein the translation element is in a relatively fixed position with respect to the thumb to which the moving device is fixed. In other words, essentially only the housing is moved.

By the first linear movement the first flexion spring is at least partially bent or buckled, whereby a restoring force of the first flexion spring increases while the first distal end of the first flexion spring is moved closer to the first proximal end of the first flexion spring. In other words, the force driving the translation element is working against an increasing restoring force of the first flexion spring.

By the second linear movement the second flexion spring is at least partially bent or buckled, whereby a restoring force of the second flexion spring increases while the second proximal end of the second flexion spring is moved closer to the second distal end of the second flexion spring. In other words, the force driving the housing is working against an increasing restoring force of the second flexion spring.

In an example of the invention it is intended that an initial restoring force, which is the restoring force in an unbent state, of the first flexion spring is lower than an initial restoring force of the second flexion spring such that the first flexion spring is bent essentially before the second flexion spring is bent which causes that the thumb fixed to the moving device is first bent at the CPC joint and essentially afterwards is bent at the MCP and/or IP joint.

In other words, the first linear movement and the second linear movement may occur essentially one after another.

Also, the first linear movement and the second linear movement may occur at least partially at the same time, essentially while there is transition between the first and second movement.

The rotation element is driven by a driving unit such as an electric motor to which it is typically mechanically connected.

By operating the gear unit, a relative translational movement between the translation element and the housing is realized that causes a bending of at least one of the flexion springs and as a result at least a partial bending of the thumb occurs.

Caused by the fixation to the thumb the bending or buckling of the thumb bending section results in a force or moment working on the thumb fixed to the moving device that results in an at least partial flexion of the thumb from an extended position to a flexed position.

By operating the gear unit in the opposite direction, the thumb is movable from an extended position to a flexed position.

The first flexion spring and the second flexion spring can be essentially arranged along the direction of the linear movement. The second flexion spring is mechanically connected to the housing in the direction of the linear movement on the opposite side of the mechanical connection of the first flexion spring to the translation element, such that the first flexion spring and/or the second flexion spring are bendable by the relative translational movement and a flexion force and/or a flexion moment is applicable to the thumb fixed to the moving device.

The rotation element can be a pinion and the translation element is a rack, wherein the pinion and the rack are adapted to intermesh such that the rotation of the pinion is transformable into the linear movement between the rack and the housing.

The mechanical connection between the second flexion spring and the thumb may be realizable by a second fixation section, that is fixable to a phalanx of the thumb, in particular to the distal phalanx of the thumb, wherein at least a translational degree of freedom of the second distal end along the direction of the linear movement is fixable by the second fixation section.

In particular all translational degrees of freedom of the second distal end are fixable by the second fixation section. Furthermore, the rotational degrees of freedom of the second distal end are fixable by the second fixation section.

Due to this fixation an increase of the distance of the second fixation section and the housing leads to a bending or buckling of the second flexion spring and therefore to a force or torque acting onto the second fixation section and therefore onto the thumb fixed to the moving device.

The second flexion spring can comprise two springs, in particular two leaf springs, arranged essentially in parallel to each other, such that the moment of inertia of the second flexion spring around an axis perpendicular to the linear movement and perpendicular to the plane in which the two springs are parallelly arranged is increased.

The two springs of the second flexion spring can be arranged in parallel to each other. In particular, both springs extend in the direction of the linear movement.

Furthermore, both springs of the second flexion spring can be arranged in parallel and essentially in a plane in which the axis of the linear movement runs and which is essentially parallel to the surface of the thumb to be moved by the moving device when the moving device is fixed to the thumb.

Further, both springs of the second flexion spring can be arranged such that they enclose, in a vertical sectional plane perpendicular to the plane in which the axis of the linear movement runs and which is essentially parallel to the surface of the thumb, an angle between 10° and 60°, wherein in another special embodiment the angle may be adjustable according to the length of the thumb to be moved, in particular to be flexed.

The first flexion spring can comprise at least one spring.

The two springs of the second flexion spring and the at least one spring of the first flexion spring are in a special embodiment leaf springs essentially made of, in particular stainless, steel with a tensile strength of at least 1500 MPa, in particular of at least 1900 MPa.

It is possible to vary the spring rate of the second flexion spring and/or the first flexion spring by a combination of several individual leaves that are arranged in parallel and or in series.

The fixation of the first flexion spring to the thumb can be realizable by a first fixation section, wherein the first flexion spring is fixable by the first fixation section such that at least a translational degree of freedom of the first proximal end along the direction of the linear movement is fixed by the first fixation section.

In particular all translational degrees of freedom of the first proximal end are fixable by the first fixation section.

The first fixation section can be adapted to connect the first flexion spring indirectly to the thumb, which means that the first flexion spring is not fixed in direct mechanical contact to the surface of the thumb. In one embodiment the first fixation section may be adapted to fix the first proximal end of the first flexion spring in a distance to the surface of the thumb. The first fixation section may therefore be adapted to realize a mechanical fixation to an interface that is fixable to a human hand, in particular to a dorsal side of the hand on the opposite side of the hand's palm and therefore is adapted for fixing the first proximal end of the first flexion spring indirectly to the thumb.

The thumb bending section can comprise a guide arranged between the fixation of the second flexion spring to the thumb and the housing, wherein the guide is adapted to be fixed to the thumb such that the guide is adapted to guide the second flexible spring by essentially fixing all translational degrees of freedom and all rotational degrees of freedom of the second flexible spring except a translational degree of freedom in the direction of the linear movement.

The guide is adapted to guide the second flexion spring, in particular when the second flexion spring is moved according to the relative translational movement, in a defined vertical distance to the thumb to which the moving device is fixed.

The second distal end of the second flexion spring can be fixable to the distal phalanx and the guide is fixable to the proximal phalanx.

The guide can be adapted to guide the second flexible spring by essentially fixing all translational degrees of freedom and all rotational degrees of freedom of the second flexible spring except a translational degree of freedom in the direction of the linear movement. In other words, the guide essentially only allows and provides a movement of the second flexion spring driven by the gear unit along the direction of the linear movement, which means along the length extension of the thumb, when the moving device is fixed to the thumb.

The second flexible spring and the guide can be connected in a way that enables the second flexible spring to slide along the guide. This means that a relative movement between the second flexible spring and the guide fixed to the thumb is realizable.

The guide can comprise at least one guiding hole or guiding rail through or along which the second flexible spring is extending. In the case of an embodiment with a second flexible spring comprising several parallel springs each spring extends through a single guiding hole or along a single guiding rail such that the springs are not in physical contact when extending along or through the guide and are therefore not interfering.

The fixation of the guide as well as of the second fixation section to the thumb may be realized by at least one strap each and/or by an adhesive substance.

The second flexion spring can comprise a first section and a second section arranged along the axis of the relative translational movement on opposite sides of the guide, wherein between the guide and the second flexion spring a frictional resistance is realized such that the friction force acts against a force acting on the second flexion spring when the second flexion spring is moved in a relative translational movement, which leads to a deformation of the first section of the second flexion spring between the housing and the guide essentially before a deformation of the second section of the second flexion spring between the guide element and the fixation of the second flexion spring to the thumb occurs.

In other words, the second flexion spring comprises a first section, which is a section essentially between the housing and the guide, and a second section, which is a section essentially between the guide and the second fixation section.

Between the guide and the second flexion spring a frictional resistance is realized which means that a sliding of the second flexion spring along the guide can be blocked by a friction force working between a surface of the guide and a surface of the second flexion spring that are in physical contact. The friction force is therefore blocking the relative translational movement by which the second proximal end of the second flexion spring is moved in distal direction.

As a consequence of the blocking by the friction force the relative movement of the second flexion spring to cause a bending or buckling of the second flexion spring is dividable in two parts.

By the first part of the relative movement of the second flexion spring the second proximal end is moved towards the second distal end, wherein, caused by the frictional resistance, essentially only the distance between the second proximal end and the guide is reduced, such that essentially only the first section of the second flexion spring is bent or buckled, and wherein, while the bending occurs, a restoring force of the first section increases with the reduction of the distance between the second proximal end and the guide. At a certain point a restoring force of the bent first section overcomes the friction force such that the sliding of the second flexion spring along the guide is no longer blocked and by a second part of the relative movement of the second flexion spring the second proximal end is movable towards the second distal end, wherein the distance between the guide and the distal end of the second flexion spring is reduced such that alternatively and/or additionally the second section of the second flexion spring is bendable. Therefore, by the first part of the relative movement of the second flexion spring the thumb is essentially flexed by a rotation around the MCP joint and by the second part of the relative movement of the second flexion spring the thumb is essentially flexed by a rotation around the IP joint, which corresponds to the natural flexion movement of a thumb.

The first part of the relative movement and the second part of the relative movement do not necessarily occur strictly one after another.

The thumb bending section can comprise at least one spring arranged in parallel to the first flexion spring and the second flexion spring, wherein a distal end of the spring is fixed to the second distal end of the second flexion spring and a proximal end of the spring is fixed to the first proximal end of the first flexion spring and wherein the spring is supported on the housing.

The spring can be arranged on the thumb-facing side of the first and/or the second flexion springs, such that the spring is located between the surface of the thumb and the first flexion spring and the second flexion spring, when the moving device according to this embodiment is fixed to a human thumb.

The spring comprises at least one spring, in particular a bendable leaf spring.

The spring can comprise a third flexion spring arranged in parallel to the first flexion spring, wherein the third flexion spring is supported in the direction of the linear movement on the housing and wherein a proximal end of the third flexion spring is fixed to the proximal end of the first flexion spring and/or the spring comprises a fourth flexion spring arranged in parallel to the second flexion spring, wherein the fourth flexion spring is supported in the direction of the linear movement on the housing and wherein a distal end of the fourth flexion spring is fixed to the distal end of the second flexion spring.

In particular the third flexion spring and the fourth flexion spring may be fixed to the housing or to an outer housing that is mechanically connected to the housing.

The outer housing can be connected to the housing such that the housing is movable relative to the outer housing, in particular such that the movement of the housing is guided by the outer housing.

While the extended length between the first proximal end of the first flexion spring and the second distal end of the second flexion spring may be changeable, in particular such that it is enlargeable by the relative translational movement, the extended length between the proximal end and the distal end of the spring is fix or unchangeable by the relative translational movement. By the fixation of the proximal end of the spring to the first proximal end of the first flexion spring and the fixation of the distal end of the spring to the second distal end of the second flexion spring, the spring is bent or buckled when the first flexion spring and/or the second flexion spring are bent or buckled, such that a flexion force and/or a flexion moment of the spring is additionally acting on the thumb fixed to the moving device.

The third flexion spring is typically arranged in a distance to the first spring in a vertical distance of at least 1 mm and at most 8 mm, in particular in a vertical distance of at least 2 mm and at most 6 mm.

The fourth flexion spring is typically arranged in a distance to the second spring in a vertical distance of at least 1 mm and at most 8 mm, in particular in a vertical distance of at least 2 mm and at most 6 mm.

The moving device can comprise a thumb opposition section, adapted to move the thumb between a resting position and an opposition position, in particular a pad opposition position and/or side opposition, wherein the thumb opposition section is pivotably connected to the thumb bending section by a pivot and wherein the thumb opposition section comprises a feeding element which is mechanically connected to the thumb bending section in a distance to the pivot such that, when a feeding force with at least one force direction component perpendicular to the direction of the linear movement is applied to the thumb bending section by the feeding element, the thumb bending section rotates around the pivot and therefore a thumb fixed to the thumb bending section is movable at least in an abducted position.

In particular the thumb opposition section is adapted to move the thumb between a resting position, in which the thumb is typically adducted to the index finger, and pad opposition, a side opposition position. At least it is adapted to move the thumb between a resting position and pad opposition position, wherein the natural thumb movement of the thumb that is the supported by the moving device is generated by an at least partial simultaneous movement of the thumb into an abducted position and an internal rotation of the thumb around the CMC joint.

The thumb opposition section can be pivotably connected to the thumb bending section by a pivot such that the thumb bending section is rotatable. The pivot is for example realized by a ball joint, wherein in a special embodiment a rotational degree of freedom around an axis perpendicular to the direction of the linear movement and in parallel to a plane in which the axis of the linear movement runs and which is essentially parallel to the surface of the thumb to be moved is fixed. In other words, the thumb bending section is rotatable around an axis in the direction of the linear movement and is rotatable around an axis perpendicular to the direction of the linear movement and perpendicular to a plane in which the axis of the linear movement runs and which is essentially parallel to the surface of the thumb to be moved.

The pivot can be arranged at the position of the mechanical connection of the first proximal end of the first flexion spring to the thumb. In particular, the pivot is arranged at the position at the CMC joint.

The thumb opposition section comprises a feeding element which is mechanically connected to the thumb bending section. Between the pivot and the position of the connection of the feeding element to the thumb bending section is a distance, in particular a distal distance with respect to the pivot. In particular, the feeding element is fixed to the housing and/or the outer housing. Alternatively or additionally, it is also possible that the feeding element is fixed to the guide and/or the second fixation section.

A feeding force caused by moving the feeding element in the direction of the thumb bending section is applicable to the thumb bending section such that the thumb bending section, and therefore a thumb fixed to the thumb moving device, is rotatable around a rotation axis of the pivot.

The rotation movement of the thumb bending section can be divided in two rotation movement parts. By the first rotation movement part the thumb fixed to the thumb moving device is movable from a resting position at least to a abducted position which corresponds essentially to a rotation of the thumb bending section around the axis perpendicular to the direction of the linear movement and perpendicular to a plane in which the axis of the linear movement runs and which is essentially parallel to the surface of the thumb to be moved.

By the second rotation movement part the thumb is moved into an opposition position, in particular a pad opposition position, which corresponds essentially to a rotation of the thumb bending section around the axis perpendicular to the direction of the linear movement.

Typically, but not necessarily, the first rotation movement part takes place before the second rotation movement part when applying the feeding force to the thumb bending section.

An advantage of this example is that the whole thumb bending section, including the gear unit, is rotatable by the thumb opposition section which supports a compact mechanical design and a high wearing comfort.

The mechanical connection between the feeding element and the thumb bending section can be realized by a pivot joint, wherein an angle of a rotary movement of the feeding element in relation to the thumb bending section is limited by a mechanical stop.

The pivot joint is arranged and adapted to rotate the feeding element around an axis perpendicular to the direction of the linear movement and perpendicular to a plane in which the axis of the linear movement runs and which is essentially parallel to the surface of the thumb.

The angle of the rotation around the pivot joint can be limited by a mechanical stop to an angle, in particular an arbitrary angle, between 5° and 50° by a first stop element and a second stop element of the mechanical stop, which enclose the said angle. In a special embodiment the angle is adjustable with respect to the individual thumb to be fixed to the moving device.

The mechanical stop may be adapted to prevent the rotary movement of the feeding element around the rotation axis of the pivot joint at a certain abduction angle of the thumb fixed to the moving device.

While the rotation movement of the thumb bending section around the pivot changes from the first rotation movement to the second rotation movement, the feeding element is rotated around the pivot joint from a first angular position, corresponding to a first stop element of the mechanical stop, to a second angular position, corresponding to a second stop element of the mechanical stop.

The feeding element can be a flexible spring, in particular a bending spring.

The spring can be adapted to be bent or buckled when the feeding force is applied to the thumb bending section. In particular the spring can be adapted to bend or buckle when the second rotation movement part of the thumb bending section occurs, such that a rotation around the axis of the linear movement is realizable.

The flexion spring can be made of, for example, stainless steel with a tensile strength of at least 1500 MPa, in particular of at least 1900 MPa.

The feeding element can be movably guided by a feeding element guide when moved to apply a feeding force onto the thumb bending section.

The feeding element guide is adapted to guide the feeding element to move in an essentially translational way.

The feeding element guide may be arranged on or is part of an interface that is fixable to a human hand, in particular to a dorsal side of the hand on the opposite side of the hand's palm.

The feeding element is adapted to be movable manually or by an actuator. In an example, the thumb opposition section comprises a handling device to move the feeding element for applying the feeding force by hand. In another embodiment the thumb moving device comprises a drive to move the feeding device.

A second aspect of the invention is a hand-exoskeleton for moving at least one finger of a human hand comprising a moving device for moving a human thumb according to the invention.

The hand-exoskeleton may comprise a driving unit adapted to at least operate the gear unit by driving the rotation element and/or to drive the movement of the feeding element.

Another aspect of the invention is a method of grasping an object, wherein a moving device according to the invention is fixed to the thumb of a human hand or a hand-exoskeleton according to the invention is fixed to a human hand and wherein an object is placed between the thumb and the palm of the hand and wherein by operating the gear unit the thumb is at least partially moved in the direction of the palm, in particular by at least partially bending, such that forces act onto the object on essentially opposite sides.

Due to these normal forces acting on the object, the object is held essentially by the friction forces resulting from the normal forces.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
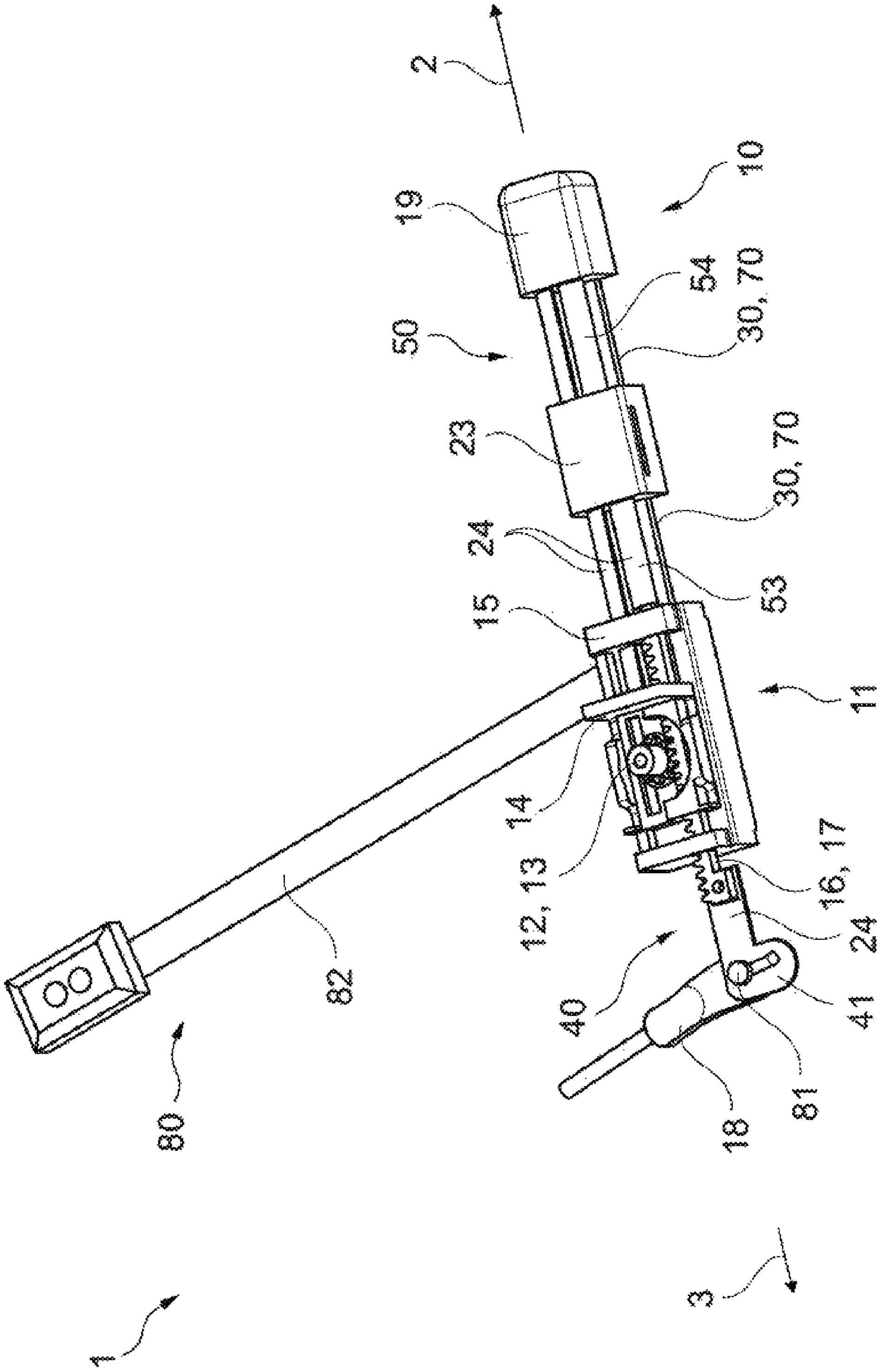
FIG. 1 shows an example of the moving device according to the invention.

FIG. 1 shows an example of the moving device 1 according to the invention. The moving device 1 comprises a thumb bending section 10 adapted to move a thumb that is fixed to the thumb bending section 10 between an extended position and a flexed position.

In the distal direction 2, the thumb bending section 10 comprises a second fixation section 19 that is in the given example adapted to be fixed to a distal phalanx of a thumb. The second fixation section 19 is fixed to a second flexion spring 50 comprising in the given example two parallel leaf springs 24 and extending from the second fixation section 19 in proximal direction 3 to the housing 14 of a gear unit 11 to which it is fixed.

The second flexion spring 50 is divided in two sections 53, 54. The first section 53 is located between the housing 14 and the guide 23. The second section 54 is located between the guide 23 and the second fixation section 19. The guide 23 is adapted to guide the second flexion spring 50 when the second flexion spring 50 is moved by the gear unit 11 in distal direction 2. The second flexion spring 50 is mechanically connected to the gear unit 11 that is adapted to move the second flexion spring 50 as well as the first flexion spring 40.

The gear unit 11 comprises a rotation element 12, which is in the given example a pinion 13, and a translation element 16, which is in the given example a rack 17. The rack 17 and the pinion 13 are arranged and adapted to intermesh. Furthermore, the gear unit 11 comprises a housing 14 to which the pinion 13 is rotatably fixed.

The rack 17 is fixed to the first distal end of the first flexion spring 40 comprising one leaf spring 24. The first proximal end 41 of the first flexion spring 40 is fixed to the first fixation section 18, wherein the first fixation section 18 is adapted to fix the first proximal end 41 of the first flexion spring 40 in a position fixed relative to the thumb. The position of the first proximal end 41 of the first flexion spring 40 is essentially the position of the carpometacarpal joint of a thumb.

By operating the pinion 13 of the gear unit 11 the rack 17 is movable in proximal direction 3 which causes a bending or buckling of the first flexion spring 40. While the bending of the first flexion spring 40 occurs the restoring force of the first flexion spring 40 increases such that at a certain point the housing 14 moves in distal direction 2 which causes a bending or buckling of the second flexion spring 50, wherein, caused by a frictional resistance between the second flexion spring 50 and the guide 23, the first section 53 of the second flexion spring 50 is bent first and afterwards the second section 54 of the second flexion spring 50 is bent.

As shown in FIG. 1 below the second flexion spring 50 a spring 30 with a fourth flexion spring 70 is arranged. The fourth flexion spring 70 is via the second fixation section 19 fixed to the second flexion spring 50. The proximal end of the fourth flexion spring 70 is fixed to an outer housing 15, which is additionally adapted to guide the housing 14 when it is moved in distal direction 2.

Furthermore, the moving device 1 shown in FIG. 1 comprises a thumb opposition section 80 with a feeding element 82 that is pivotably fixed to the outer housing 15. The thumb opposition section 80 is rotatably connected to the thumb bending section 10 by a pivot 81, which is in one example a ball joint. By moving the feeding element 82 in the direction of the outer housing 15 a feeding force is applicable to the thumb bending section 10 such that the thumb bending section 10 is rotatable around at least one rotation axis of the pivot 81.

Figure 2:
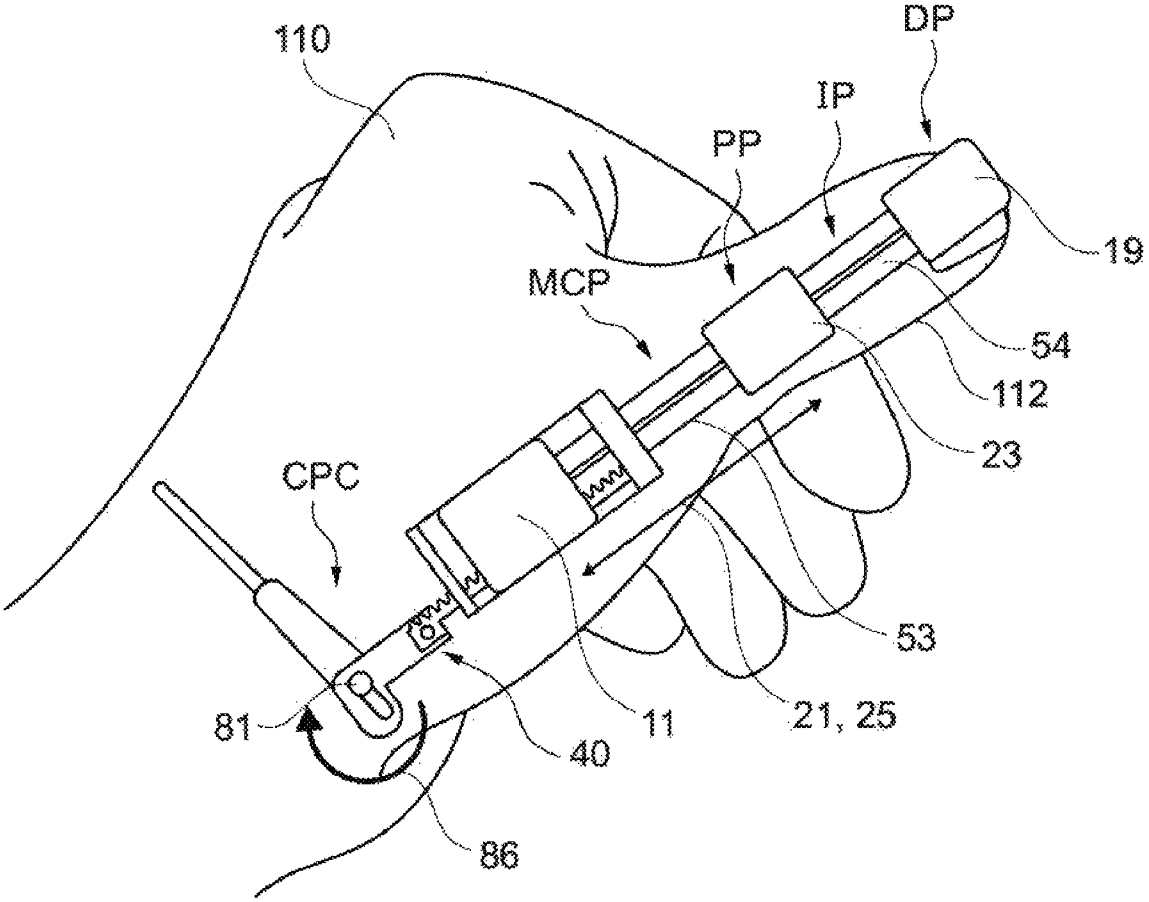
FIG. 2 shows how a moving device according to the invention is fixed to the thumb of a human hand.

FIG. 2 shows how a moving device 1 is fixed to the thumb 112 of a human hand 110. It is shown that the second fixation section 19 is fixed to the distal phalanx DP, that the second section 54 of the second flexion spring is arranged above the interphalangeal joint IP, that the guide 23 is fixed to the proximal phalanx PP, that the first section 53 of the second flexion spring is arranged above the metacarpophalangeal joint MPC, that the gear unit 11 is arranged between the metacarpophalangeal joint MPC and the interphalangeal joint IP and that the first proximal end 41 of the first flexion spring 40 as well as the pivot 81 of the thumb opposition section is arranged above the carpometacarpal joint CPC. The feeding element that causes by a feeding force the rotation movement 86 around at least one rotation axis of the pivot 81 is not shown here. An arrow indicates the second relative translational movement 25 of the relative translational movement 21 that causes the bending of the second flexion spring.

Figure 3C:
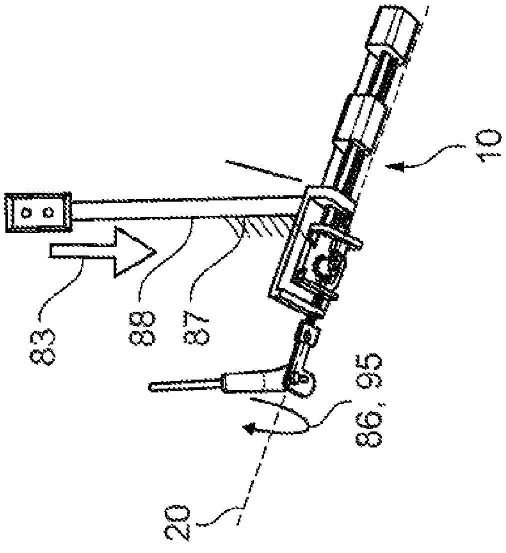
FIG. 3*c* shows a third state of the thumb opposition section.
Figure 3B:
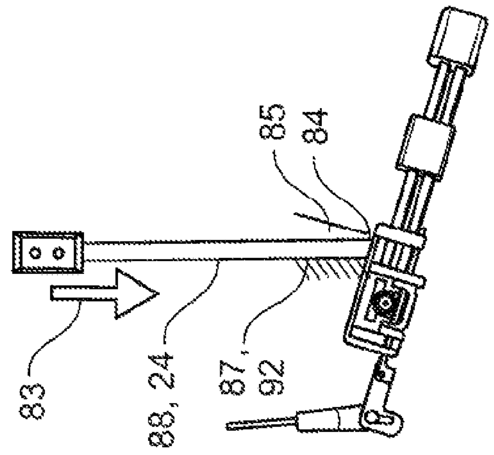
FIG. 3*b* shows a second state of the thumb opposition section.
Figure 3A:
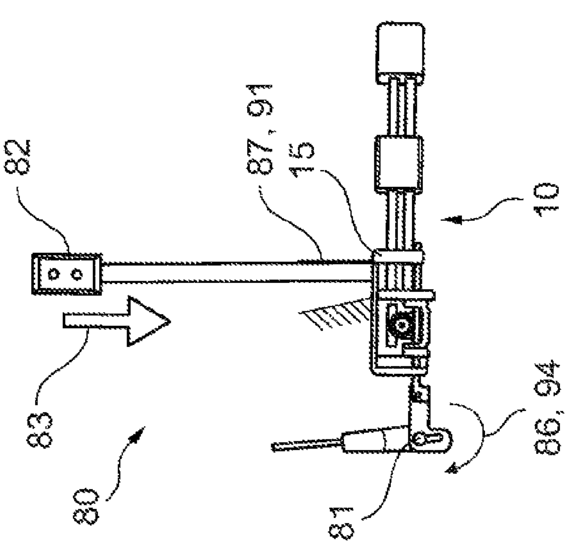
FIG. 3*a* shows a first state of the thumb opposition section.

FIG. 3 shows the function of the thumb opposition section 80 in three steps. FIG. 3*a* shows a first state of the thumb opposition section 80 in the resting position, in which a thumb to which the moving device is fixed is unflexed and adducted to the index finger. FIG. 3*b* shows a second state of the thumb opposition section 80 when the thumb to which the moving device is fixed is already in a position in which the thumb is an abducted position, in particular in a side opposition position. FIG. 3*c* shows a third state of the thumb opposition section 80 in which the thumb is in pad opposition position.

When the feeding element 82 is moved in the direction of the thumb bending section 10 a feeding force 83 is applied to the outer housing 15 to which the feeding element 82 is connected via a pivot joint 85. The feeding element 82 is guided by a mechanical stop 87. In the first state shown in FIG. 3*a* the feeding element 82 is in contact with a first stop element 91. The feeding force 83 of the feeding element 82 in combination with the pivot 81 causes that the thumb opposition section 80 is adapted to cause a rotation movement 86 of the thumb bending section 10. The comparison of FIG. 3*a* and FIG. 3*b* shows that a first rotation movement 94 around a rotation axis of the pivot 81 perpendicular to the plane of the figure is limited by the angle 85 enclosed by the first stop element 91 and the second stop element 92 of the mechanical stop 87.

By further applying the feeding force 83 to the thumb bending section 10 as it is shown in FIG. 3*c*, a second rotation movement 95 around the axis of the linear movement 20 is caused. To allow this second rotation movement 95 the feeding element 82 is designed as a flexion spring 88, in particular as a leaf spring 24.

Figure 4:
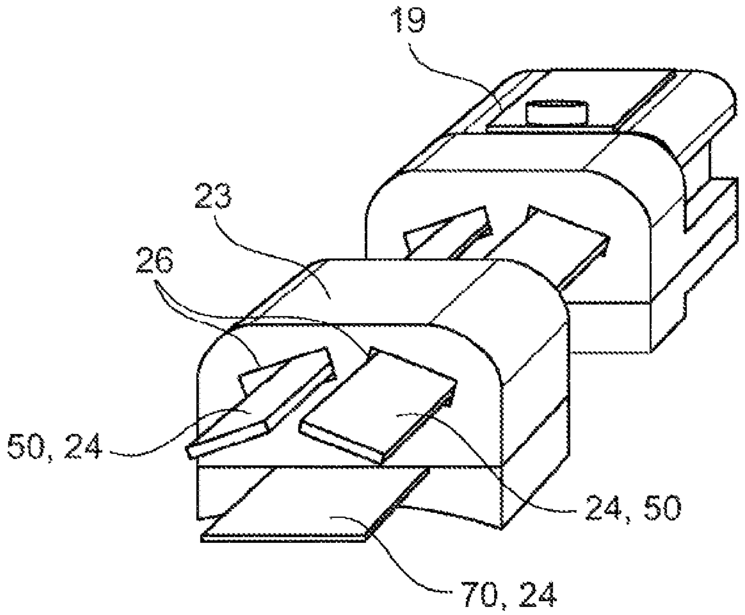
FIG. 4 shows a first detail of an example of the moving device according to the invention.

FIG. 4 shows a first detail of an embodiment of the moving device 1. It can be seen that the second flexion spring 50 comprises two parallel springs, designed as leaf springs 24, which enclose an angle. The two leaf springs 24 are guided by the guide 23. The guide 23 therefore comprises two guiding holes 26, wherein each leaf spring 24 runs through a single guiding hole 26. In other words, the leaf springs 24 are movable relative to the guide 23 by sliding through the guiding holes 26. In the rear part of FIG. 4 the second fixation section 19 is shown.

Below the second flexion spring 50 a fourth flexion spring 70 is arranged, which comprises one leaf spring 24 in the given example. The leaf spring 24 of the fourth flexion spring 70 is guided by the guide 23 as well, which is not shown here in detail.

Figure 5:
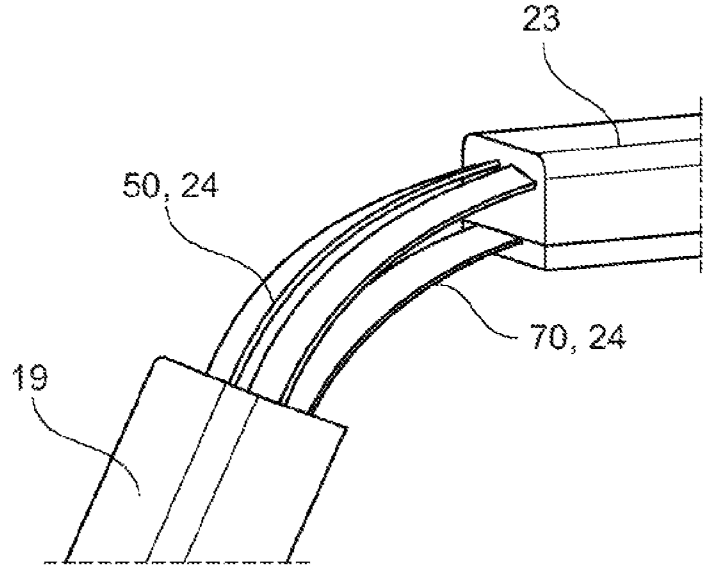
FIG. 5 shows a second detail of an example of the moving device according to the invention.

FIG. 5 shows a second detail of an embodiment of the moving device illustrating the bending of the second flexion spring 50 and the fourth flexion spring 70 according to the relative translational movement. Caused by the movement of the second flexion spring 50 in the direction of the second fixation section 19 the leaf spring 24 or leaf springs 24 of the second flexion spring 50 are bent. Because of the fixation of the fourth flexion spring 70 to the second fixation section 19 the leaf spring 24 of the fourth flexion spring 70 is bent as well. By the bending a flexion force and/or a flexion moment is applicable to a thumb that is fixed to the moving device.

Figure 6:
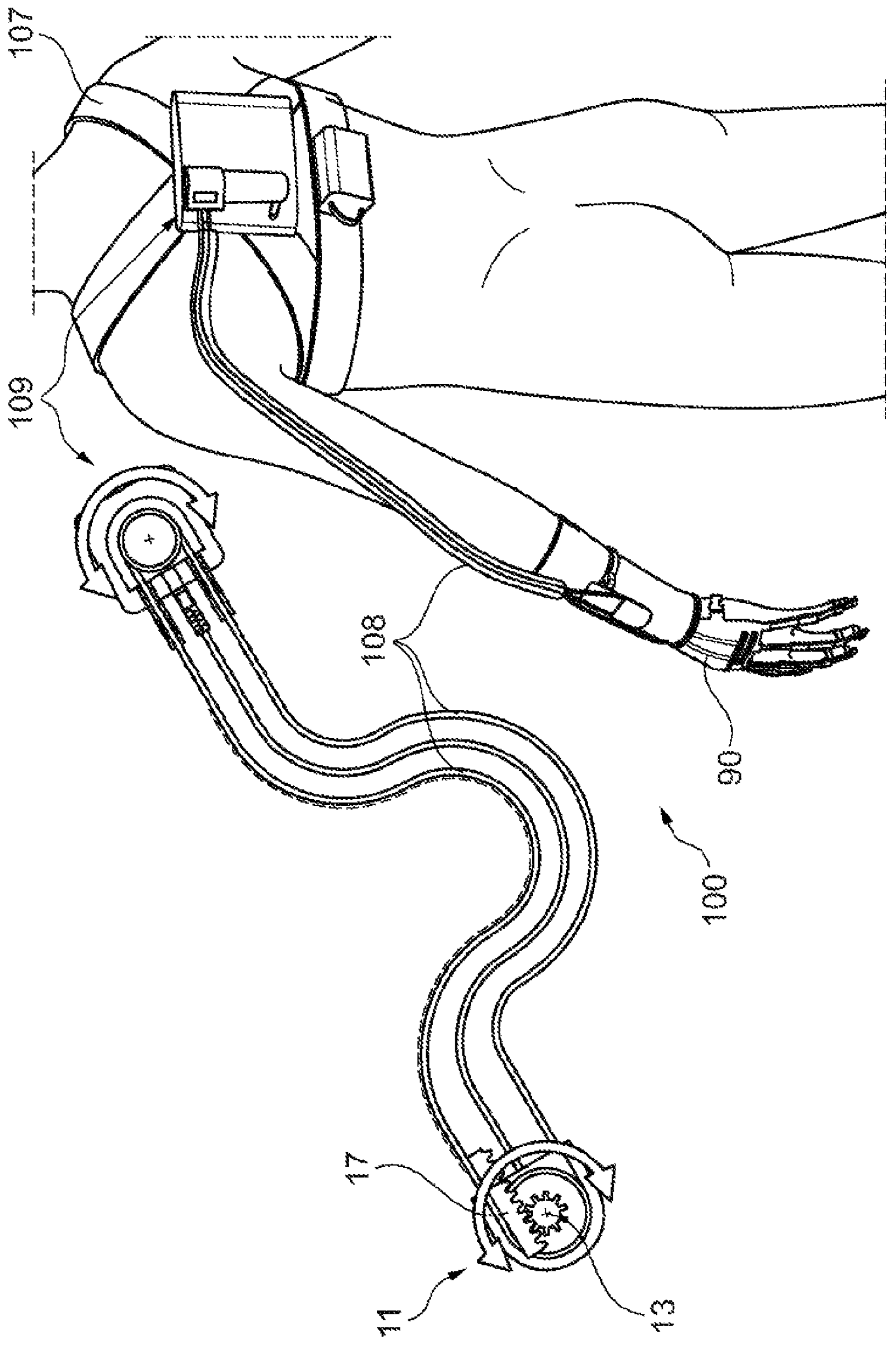
FIG. 6 is an example of a hand-exoskeleton according to the invention.

FIG. 6 shows an embodiment of a hand-exoskeleton 100. The hand exoskeleton 100 comprises a driving unit 109 that is fixable to a human body by a harness 107. The driving unit is via an interface 90 which is adapted to be fixed to the dorsal side of the hand connected by a bowden cable 108 with the gear unit 11 of the moving device such that by the bowden cable 108 the pinion 13 can be rotated so that the rotation of the pinion 13 can be transferred into a linear movement between the rack 17 and the housing.

Figure 7:
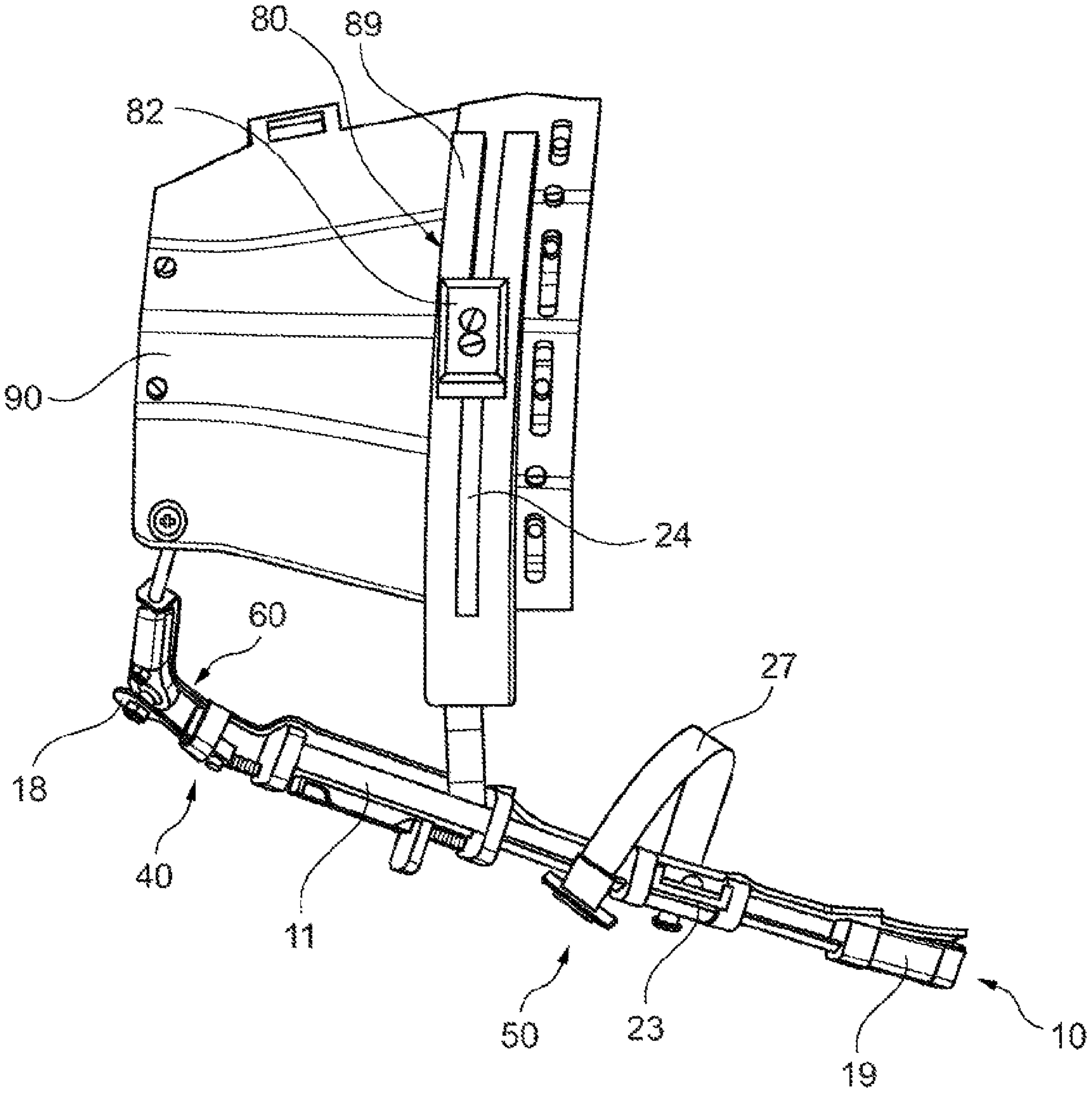
FIG. 7 is an example of the moving device according to the invention.

FIG. 7 shows another embodiment of the moving device 1 according to the invention. In particular FIG. 7 shows an interface 90 that is adapted to be fixed to the dorsal side of a hand. On the upper side of the interface 90 the feeding element guide 89 is shown that guides the feeding element 82 when moved in the direction of the thumb bending section 10. The feeding element 82 comprises a leaf spring 24. The feeding element 82 is mechanically connected to the gear unit 11, wherein the pivot joint, which realizes this rotatable connection, as well as the mechanical stop are not shown here. The gear unit 11 is arranged between the first flexion spring 40 and the second flexion spring 50. The first flexion spring 40 extends between the first fixation section 18 and the gear unit 11. The second flexion spring 50 extends between the second fixation section 19 and the gear unit 11. FIG. 7 also shows a third flexion spring 60. Furthermore, it is shown that the guide 23 is adapted to be fixed to the thumb by a strap 27.

Figure 8:
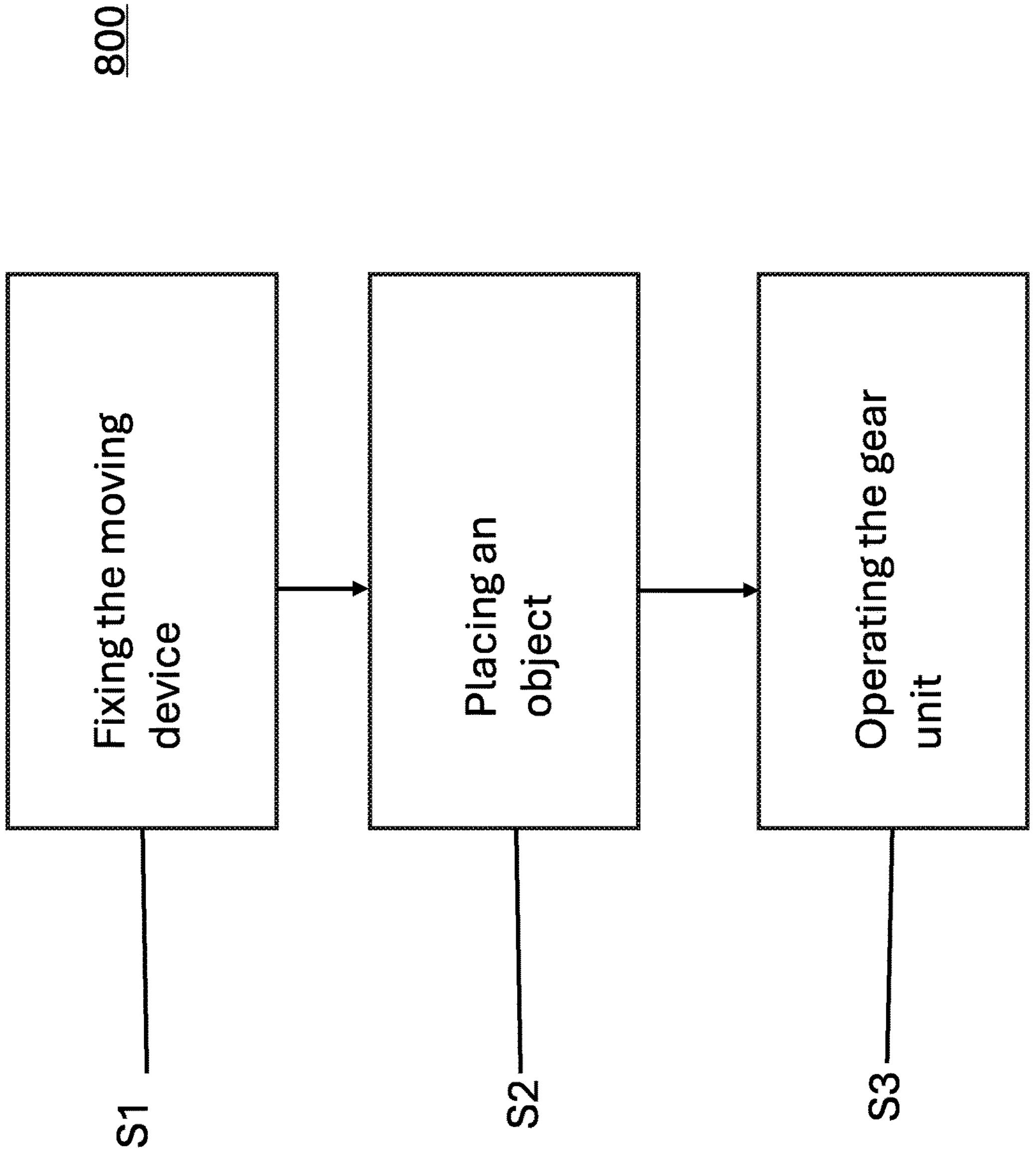
FIG. 8 illustrates a method of grasping an object according to the invention.

FIG. 8 illustrates a method 800 of grasping an object. The method includes fixing (S1) the moving device 1 to the thumb of a human hand or a hand-exoskeleton is fixed to a human hand; placing (S2) an object between the thumb and the palm of the human hand; and operating (S3) the gear unit 11 such that the thumb is at least partially moved in a direction of the palm by at least partial bending such that forces act onto the object on essentially opposite sides.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A moving device to move a human thumb between a resting position and a grasping position, the moving device comprising:

a thumb bending section adapted to at least partially move the human thumb between a flexed position and an extended position, the thumb bending section comprising:

a gear unit for transforming a rotation of a rotation element, which is rotatably mounted to a housing, into an essentially linear movement between a translation element and the housing;

a first flexion spring mechanically connected to the translation element via a mechanical connection and a first proximal end of the first flexion spring adapted to be fixed relative to the human at a position between the metacarpophalangeal joint and a carpometacarpal joint; and a second flexion spring mechanically connected to the housing and a second distal end of the second flexion spring adapted to be fixed to the human thumb at a position in a distal distance to the metacarpophalangeal joint or at a distal phalanx and/or a proximal phalanx of the human thumb, the gear unit configured to realize a relative translational movement between the translation element and the housing to cause bending of at least one of the first or second flexion springs and at least a partial bending of the human thumb.

2. The moving device according to claim 1, wherein the first flexion spring and the second flexion spring are arranged essentially along a direction of the linear movement, and wherein the second flexion spring is mechanically connected to the housing in the direction of the linear movement on an opposite side of a mechanical connection of the first flexion spring to the translation element such that the first flexion spring and/or the second flexion spring are bendable by the relative translational movement and a flexion force and/or a flexion moment is applicable to the human thumb fixed to the moving device.

3. The moving device according to claim 1, wherein the rotation element is a pinion and the translation element is a rack, wherein the pinion and the rack are adapted to intermesh such that the rotation of the pinion is transformable into the linear movement between the rack and the housing.

4. The moving device according to claim 1, wherein a mechanical connection between the second flexion spring and the human thumb is realizable by a second fixation section that is fixable to a phalanx of the human thumb or to a distal phalanx of the human thumb, and wherein at least a translational degree of freedom of the second distal end of the second flexion spring along the direction of the linear movement is fixable by the second fixation section.

5. The moving device according to claim 4, wherein the thumb bending section comprises a guide arranged between the second fixation section and the housing, and wherein the guide is adapted to be fixed to the human thumb such that the guide is adapted to guide the second flexible spring by essentially fixing all translational degrees of freedom and all rotational degrees of freedom of the second flexible spring except a translational degree of freedom in the direction of the linear movement.

6. The moving device according to claim 5, wherein the second flexion spring comprises a first section and a second section arranged along an axis of the relative translational movement on opposite sides of the guide, wherein a frictional resistance between the guide and the second flexion acts against a force acting on the second flexion spring, and wherein the first section of the second flexion spring is configured to be between the housing and the guide and the second flexion spring configured to be between the guide element and the second fixation section; the second flexion spring is configured to move in a relative translational movement which deforms the first section of the second flexion spring before a deformation of the second section of the second flexion spring occurs.

7. The moving device according to claim 1, wherein the second flexion spring comprises two springs or two leaf springs arranged essentially in parallel to each other such that a moment of inertia of the second flexion spring around an axis substantially perpendicular to the linear movement and substantially perpendicular to the plane in which the two springs are parallelly arranged is increased.

8. The moving device according to claim 1, wherein a first fixation section is configured to fix the first flexion spring to the human thumb, and wherein the first flexion spring is fixable by the first fixation section such that at least a translational degree of freedom of the first proximal end of the first flexion spring along the direction of the linear movement is fixed by the first fixation section.

9. The moving device according to claim 1, wherein the moving device comprises a thumb opposition section adapted to move the human thumb between a resting position and an opposition position or a pad opposition position and/or side opposition position, wherein the thumb opposition section is pivotably connected to the thumb bending section by a pivot, wherein the thumb opposition section comprises a feeder that is mechanically connected to the thumb bending section in a distance to the pivot such that when a feeding force with at least one force direction component substantially perpendicular to the direction of the linear movement is applied to the thumb bending section by the feeder, and wherein the thumb bending section is configured to rotate around the pivot and the thumb bending section, configured to be fixed to the human thumb, is movable at least in an abducted position.

10. The moving device according to claim 9, wherein a pivot joint is configured to provide a mechanical connection between the feeder and the thumb bending section, and wherein a mechanical stop is configured to limit an angle of a rotary movement of the feeder in relation to the thumb bending section.

11. The moving device according to claim 9, wherein the feeder is a flexible spring or a bending spring.

12. The moving device according to claim 9, wherein the feeder is movably guided by a feeding element guide when moved to apply a feeding force onto the thumb bending section.

13. A hand-exoskeleton for moving at least one finger of a human hand, the hand-exoskeleton comprising the moving device for moving the human thumb according to claim 1.

14. A method of grasping an object, the method comprising:

fixing the moving device according to claim 1 to the thumb or the hand-exoskeleton according to claim 13 is fixed to a human hand;

placing an object between the thumb and the palm of the human hand; and operating the gear unit such that the thumb is at least partially moved in a direction of the palm by at least partial bending such that forces act onto the object on essentially opposite sides.

* * * * *